United States Patent
Makinoshima et al.

(10) Patent No.: US 7,659,360 B2
(45) Date of Patent: Feb. 9, 2010

(54) LOW WATER-ABSORPTIVE POLYIMIDE RESIN AND METHOD FOR PRODUCING SAME

(75) Inventors: Takashi Makinoshima, Kanagawa (JP); Shuta Kihara, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 11/722,190

(22) PCT Filed: Dec. 19, 2005

(86) PCT No.: PCT/JP2005/023281

§ 371 (c)(1), (2), (4) Date: Jun. 20, 2007

(87) PCT Pub. No.: WO2006/068096

PCT Pub. Date: Jun. 29, 2006

(65) Prior Publication Data

US 2008/0132667 A1      Jun. 5, 2008

(30) Foreign Application Priority Data

Dec. 24, 2004    (JP) .............................. 2004-372949

(51) Int. Cl.
  *C08G 69/08* (2006.01)
(52) U.S. Cl. ...................... 528/310; 528/315; 528/318; 528/322; 528/422; 528/363; 528/271; 528/288; 528/292; 528/302; 428/1.1; 428/1.26; 428/1.61
(58) Field of Classification Search ............... 428/1.26, 428/473.5, 332, 626, 458, 378, 901, 480, 428/395, 411.1, 1.1, 1.61; 525/390; 528/272, 528/170, 172, 353, 188, 229, 185, 350, 335, 528/271, 308.1, 288, 292, 302, 310, 315, 528/318, 322, 422, 363; 427/384, 385.5, 427/388.1, 393.5, 407.1, 99.1
See application file for complete search history.

(56) References Cited

U.S. PATENT DOCUMENTS

| | | | |
|---|---|---|---|
| 3,639,343 A | 2/1972 | Su et al. | |
| 4,421,905 A | 12/1983 | Lee | |
| 4,464,489 A | 8/1984 | Noda et al. | |
| 5,148,300 A * | 9/1992 | Mizushima et al. | 428/1.26 |
| 2004/0063900 A1 | 4/2004 | Kaneshiro et al. | |
| 2004/0132888 A1 | 7/2004 | Naiki et al. | |
| 2006/0205891 A1* | 9/2006 | Tanaka et al. | 525/390 |

FOREIGN PATENT DOCUMENTS

| | | |
|---|---|---|
| EP | 0 345 064 | 12/1989 |
| JP | 57-044618 | 3/1982 |
| JP | 58-007449 | 1/1983 |
| JP | 61-095030 | 5/1986 |
| JP | 01-303413 | 12/1989 |
| JP | 04-248864 | 9/1992 |
| JP | 05-281551 | * 10/1993 |
| JP | 08-143666 | 6/1996 |
| JP | 08-225645 | 9/1996 |
| JP | 2001-158816 | 6/2001 |
| JP | 2003-155342 | 5/2003 |
| JP | 2003-168800 | 6/2003 |
| JP | 2004-211064 | 7/2004 |
| JP | 2004-241704 | 8/2004 |

OTHER PUBLICATIONS

Supplementary European Search Report dated Aug. 18, 2008, for Application No. EP 05 81 6656.
Official Action issued May 8, 2009, for Application No. 200580043720.5 (English translation only).

* cited by examiner

*Primary Examiner*—Ling-Siu Choi
*Assistant Examiner*—Frances Tischler
(74) *Attorney, Agent, or Firm*—Antonelli, Terry, Stout & Kraus, LLP.

(57) ABSTRACT

A polyimide resin is produced by the reaction of a compound selected from 1,2,4,5-cyclohexanetetracarboxylic acid, dianhydride thereof and reactive derivatives thereof and a compound selected from diamines and diisocyanates each containing at least one phenylene group and at least one isopropylidene group. The polyimide resin is colorless and exhibits a high heat resistance, a high transparency and a low water absorption.

14 Claims, No Drawings

LOW WATER-ABSORPTIVE POLYIMIDE RESIN AND METHOD FOR PRODUCING SAME

TECHNICAL FIELD

The present invention relates to colorless transparent low water-absorptive polyimide resins, a process for producing the polyimide resins, a process for producing films made of the polyimide resins, and sealing materials containing the polyimide resins.

BACKGROUND ART

In general, polyimide resins are heat-resistant resins by the dehydrating cyclization of a polyamic acid which is produced by the condensation between an aromatic tetracarboxylic anhydride and an aromatic diamine. The polyimide resins have been extensively used as films, coating materials, molded parts and insulating materials in various applications such as electric, electronic, automobile and aerospace industries because of their exhibit excellent resistance to pyrolysis due to a rigidity of molecular chain, a resonance stability and a strong chemical bond, excellent resistance to chemical changes such as oxidation and hydrolysis, and excellence in mechanical properties, electrical properties and flexibility.

However, in general, films made of the aromatic polyimide resins tend to be colored yellow or brown by the absorption of visible light attributable to the formation of intramolecular or intermolecular electron transfer complexes. Therefore, the polyimide resins are unsuitable for optical applications such as materials of a substrate for flat panel displays and mobile phones, and optical fibers, light wave guides and optical adhesives. In the optical applications, it has been keenly demanded to develop highly heat-resistant, transparent resins which combine a good flexibility, a good resistance to heat discoloration and an excellent mechanical strength.

Polymethyl methacrylates conventionally used as optical plastics have a low birefringence and a colorless transparency, but are lacking in heat resistance, and therefore, unusable in the optical applications. Also, polycarbonates have a relatively high glass transition temperature, but are unsatisfactory in the resistance to heat discoloration which is required in the optical applications and further have a high birefringence, thereby failing to meet the requirements for the optical applications.

Sealing materials for photoelectric transfer devices such as light-emitting diodes (LED) and optical sensors have been required to have a colorless transparency, an easy moldability and a heat resistance. In particular, as the sealing materials for LED, there have been extensively used epoxy resins that are excellent in these properties (Patent Document 1). With the recent progress of development of light-emitting materials, LED capable of not only exhibiting a higher luminance but also emitting light having a shorter wavelength such as blue light and ultraviolet light tends to become predominant. With such a tendency, the sealing materials used for LED are frequently exposed to a high temperature and a high-energy light radiation. Known epoxy resins are lacking in heat resistance and light resistance, therefore, tend to suffer from discoloration (yellowing), etc. Thus, the epoxy resins have failed to maintain a colorless transparency for a long period of time. From the standpoint of environmental protection, lead-free soldering is prevailing, which causes such a tendency that the temperature used upon mounting the LED also increases. Therefore, the lead-free soldering is hardly applicable to known epoxy resins having a poor heat resistance.

To solve the above problems, it has been attempted to use silicone resins having excellent heat resistance and light resistance as the sealing material. However, the silicone resins have defects such as poor adhesion and brittleness. Therefore, devices using the silicone resins tend to be unsatisfactory in reliability. Further, when using the silicone-based resins as the sealing material, an electric defective contact tends to occur owing to volatile components generated from the resins under a high-temperature condition for mounting the devices. Further, according to the Snell's law, in order to enhance a light extraction efficiency of LED, the sealing material preferably exhibits a higher refractive index in the wavelength range of light emitted therefrom. However, known epoxy resins and silicone resins generally have a refractive index of less than 1.55. Thus, it has been demanded to develop sealing materials having a higher refractive index.

Further, the epoxy resins or silicone-based resins conventionally used for sealing LED are thermosetting resins requiring a long curing time upon the sealing, resulting in problems such as a prolonged time for production of LED. To solve these problems, there has been proposed a method of injection-molding a thermoplastic resin for sealing LED (Patent Document 2). However, in this method, there tends to arise such a problem that the sealing resin is softened and deformed under a high-temperature condition used upon mounting LED, resulting in incomplete sealing of LED.

As materials that are free from these problems, there have been proposed colorless transparent polyimide resins. As the polyimide resins having a high heat resistance and a high transparency, there are described fluorinated polyimide resins having a repeating unit containing a perfluoroalkyl group (Patent Documents 3 and 4). The fluorinated polyimide resins have a poor solubility in a solvent. For this reason, a polyamic acid having a poor storage stability is cast to form a coating film, and then the obtained coating film is heated at a temperature as high as 350° C. for the imidation of the polyamic acid, thereby obtaining a desired film. However, the film is easily discolored yellow due to fluorine when subjected to heat treatments for the film formation and imidation, and suffers from unstable surface smoothness and difficulty in controlling the thickness.

There is disclosed a method of producing a heat-fusible polyimide resin by using 1,2,4,5-cyclohexanetetracarboxylic dianhydride (Patent Document 5). In Examples thereof, 1,2,4,5-cyclohexanetetracarboxylic dianhydride is reacted with diaminodiphenylmethane to obtain a polyamic acid which is then imidated under heating, and the polyimide obtained is subjected to heat-pressure formation to produce a transparent yellow polyimide resin film having a glass transition temperature of 304° C. In addition, it is reported that a less-discolored transparent film having a glass transition temperature of 300° C. or higher is obtained from a polyimide resin solution prepared from 1,2,4,5-cyclohexanetetracarboxylic dianhydride and diaminodiphenyl ether (Patent Document 6). The method described in Patent Document 5 includes the imidation step at a high temperature similarly to the conventional methods, and therefore, fails to exhibit a sufficient effect of preventing the polyimide resin from being undesirably discolored. In addition, the polyimide resin films described in both the patent documents have a high water absorption, and therefore, tends to be deteriorated in dimensional stability upon moisture absorption.

Patent Document 1: JP 2001-158816A
Patent Document 2: JP 4-248864A
Patent Document 3: JP 8-143666A
Patent Document 4: JP 8-225645A
Patent Document 5: U.S. 3,639,343
Patent Document 6: JP 2003-168800A

DISCLOSURE OF THE INVENTION

In view of solving the above conventional problems, an object of the present invention is to provide a low water-absorptive polyimide resin which is excellent in flexibility, heat resistance, transparency and dimensional stability, and suitably applicable to optical applications such as materials of a substrate for flat panel displays and mobile phones, optical fibers, light wave guides and optical adhesives.

Another object of the present invention is to provide a low water-absorptive polyimide resin suitable as a sealing material for photoelectric transfer devices such as LED and optical sensors, which is capable of realizing lead-free soldering upon mounting the devices and allowing the devices to exhibit a high light extraction efficiency, and shows a colorless transparency, a high heat resistance, a high refractive index and a less discoloration when exposed to a high temperature.

Still another object of the present invention is to provide a process for producing a film made of the polyimide resin.

Still another object of the present invention is to provide a sealing material containing the polyimide resin.

As a result of extensive researches for achieving the above objects, the inventors have found that a polyimide resin obtained by the imidation between a compound selected from the group consisting of specific alicyclic tetracarboxylic acids, alicyclic tetracarboxylic dianhydrides and reactive derivatives thereof and a compound selected from the group consisting of diamines and diisocyanates having a specific structure exhibits a low water absorption while maintaining a high heat resistance and a high transparency. The present invention has been accomplished on the basis of the finding.

Thus, the present invention provides a process for producing a polyimide resin, including a step of reacting at least one acyl-containing compound with at least one imino-forming compound, wherein the acyl-containing compound is selected from the group consisting of 1,2,4,5-cyclohexane-tetracarboxylic acid represented by the following formula 1:

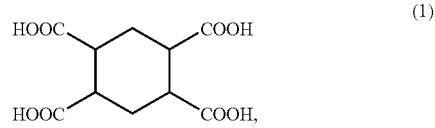

1,2,4,5-cyclohexanetetracarboxylic dianhydride represented by the following formula 2:

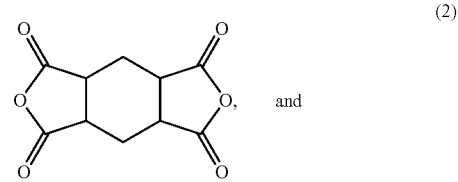

reactive derivatives thereof, and the imino-forming compound is selected from the group consisting of compounds containing at least one phenylene group and at least one isopropylidene group, which is represented by the following formula 3:

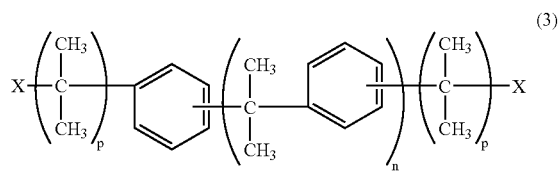

wherein X is —NH$_2$ or —N=C=O, n is an integer of 0 to 4, p is 0 or 1, and n+p is an integer of 1 to 5.

The present invention also provides a polyimide resin having a repeating unit represented by the following formula 4:

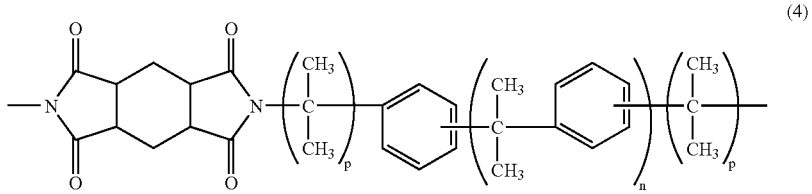

wherein n and p are the same as defined above.

The present invention further provides a process for producing a polyimide film from a solution of the polyimide resin obtained by the above process, and a sealing material for photoelectric transfer devices which contains the polyimide resin.

PREFERRED EMBODIMENTS FOR CARRYING OUT THE INVENTION

The polyimide resin of the present invention is produced by the reaction of at least one acyl-containing compound and at least one imino-forming compound in an organic polar solvent. The acyl-containing compound is selected from the group consisting of 1,2,4,5-cyclohexanetetracarboxylic acid represented by the following formula 1:

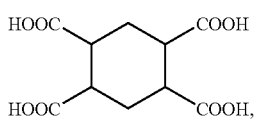

(1)

1,2,4,5-cyclohexanetetracarboxylic dianhydride represented by the following formula 2:

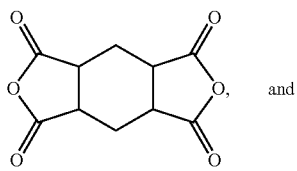

(2)

and reactive derivatives thereof. The imino-forming compound is selected from the group consisting of compounds containing at least one phenylene group and at least one isopropylidene group, which is represented by the following formula 3:

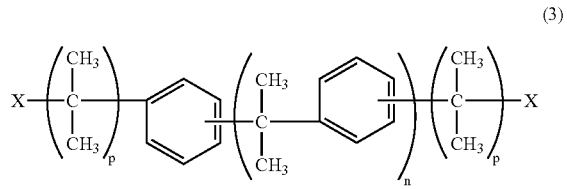

(3)

wherein X is —$NH_2$ or —N=C=O, n is an integer of 0 to 4, p is 0 or 1, and n+p is an integer of 1 to 5.

Examples of the acyl-containing compound include 1,2,4,5-cyclohexanetetracarboxylic dianhydride, 1,2,4,5-cyclohexanetetracarboxylic acid, monomethyl 1,2,4,5-cyclohexanetetracarboxylate, dimethyl 1,2,4,5-cyclohexanetetracarboxylate, trimethyl 1,2,4,5-cyclohexanetetracarboxylate, tetramethyl 1,2,4,5-cyclohexanetetracarboxylate, monoethyl 1,2,4,5-cyclohexanetetracarboxylate, diethyl 1,2,4,5-cyclohexanetetracarboxylate, triethyl 1,2,4,5-cyclohexanetetracarboxylate and tetraethyl 1,2,4,5-cyclohexanetetracarboxylate, with 1,2,4,5-cyclohexanetetracarboxylic dianhydride being preferred. These acyl-containing compounds may be used alone or in combination of two or more.

Examples of the imino-forming compound include 2,2-bis(3-aminophenyl)propane, 2,2-bis(4-aminophenyl)propane, 1,3-bis(3-amino-α,α-dimethylbenzyl)benzene, 1,3-bis(4-amino-α,α-dimethylbenzyl)benzene, 1,4-bis(3-amino-α,α-dimethylbenzyl)benzene, 1,4-bis(4-amino-α,α-dimethylbenzyl)benzene, 2,2-bis[4-(3-amino-α,α-dimethylbenzyl)phenyl]propane, 2,2-bis[4-(4-amino-α,α-dimethylbenzyl)phenyl]propane, 2,2-bis(3-isocyanatophenyl)propane, 2,2-bis(4-isocyanatophenyl)propane, 1,3-bis(3-isocyanato-α,α-dimethylbenzyl)benzene, 1,3-bis(4-isocyanato-α,α-dimethylbenzyl)benzene, 1,4-bis(3-isocyanato-α,α-dimethylbenzyl)benzene, 1,4-bis(4-isocyanato-α,α-dimethylbenzyl)benzene, 2,2-bis[4-(3-isocyanato-α,α-dimethylbenzyl)phenyl]propane, 2,2-bis[4-(4-isocyanato-α,α-dimethylbenzyl)phenyl]propane, m-α,α,α',α'-tetramethylxylylenediamine, m-α,α,α',α'-tetramethylxylylene diisocyanate, 2,2-bis[4-(dimethylaminomethyl)phenyl]propane and 2,2-bis[4-(dimethylisocyanatomethyl)phenyl]propane, with diamine compounds represented by the formula 3 in which two Xs are both —$NH_2$. These imino-forming compounds may be used alone or in combination of two or more.

To control various properties such as heat resistance, thermal expansion coefficient, dielectric constant, refractive index and birefringence, other diamines, if needed, may be additionally used in an amount of 1 to 49 mol % on the basis of the imino-forming compound unless a good low water-absorption of the polyimide resin is adversely affected.

Examples of the diamine which may be additionally used include, but not limited to, m-phenylenediamine, p-phenylenediamine, 4,4'-diaminodiphenyl ether, 3,3'-diaminodiphenyl ether, 4,4'-diaminodiphenylmethane, 3,3'-diaminodiphenylmethane, 4,4'-diaminodiphenyl sulfone, 3,3'-diaminodiphenyl sulfone, 4,4'-diaminobenzophenone, 3,3'-diaminobenzophenone, 1,3-bis(3-aminophenoxy)benzene, 1,3-bis(4-aminophenoxy)benzene, 1,4-bis(4-aminophenoxy)benzene, 4,4'-bis(3-aminophenoxy)biphenyl, 4,4'-bis(4-aminophenoxy)biphenyl, bis[4-(3-aminophenoxy)phenyl] sulfone, bis[4-(4-aminophenoxy)phenyl] sulfone, bis[4-(3-aminophenoxy)phenyl] ether, bis[4-(4-aminophenoxy)phenyl] ether, bis[4-(3-aminophenoxy)phenyl]propane, bis[4-(4-aminophenoxy)phenyl]propane, bis(4-aminocyclohexyl)methane, m-xylylenediamine, p-xylylenediamine and isophorone diamine.

The organic polar solvent used in the production process of the present invention is not particularly limited, and is preferably an aprotic organic polar solvent. Examples thereof include γ-butyrolactone, N,N-dimethylacetamide, N,N-dimethylformamide, N-methyl-2-pyrrolidone, dimethylsulfoxide, p-chlorophenol, m-cresol and tetrahydrofuran, with γ-butyrolactone and N,N-dimethylacetamide being preferred because the colorless transparency is enhanced. These organic polar solvents may be used alone or in combination of two or more.

In the following, the process for producing the polyimide resin and the process for producing the polyimide film by using an organic polar solvent solution of the obtained polyimide resin are described.

Preparation of Polyimide Resin Solution

At least one imino-forming compound is dissolved in the organic polar solvent. The amount of the imino-forming compound to be dissolved is preferably from 10 to 30 parts by weight per 100 parts by weight of the organic polar solvent. Then, at least one acyl-containing compound is added to the resultant solution at −5° C. to about room temperature, and the obtained mixture is allowed to stand at a temperature of from about room temperature to 100° C. for 30 to 60 min to prepare a polyamic acid solution.

The total amount of the at least one imino-forming compound and the at least one acryl-containing compound in the reaction solution is preferably from 20 to 50% by weight and more preferably from 30 to 40% by weight on the basis of the weight of the reaction solution. When being 20% by weight or more, the resultant polyimide resin has an adequate intrinsic viscosity. When being 50% by weight or less, the resultant polyimide resin is prevented from suffering from an excessive increase in intrinsic viscosity, thereby avoiding problems such as difficulty in uniformly stirring the polyimide resin solution owing to an excessively high viscosity and the occurrence of scorching of the resin.

After optionally adding an imidation catalyst, the reaction solution is refluxed under heating while distilling off the water being generated to conduct the dehydration reaction until the water is no longer distilled off, thereby obtaining a polyimide resin solution. The imidation catalyst may be selected from tertiary amines such as trimethylamine, triethylamine, tri-n-propylamine, tri-n-butylamine, pyridine and β-picoline; inorganic acids such as phosphorous acid, phosphoric acid, hydrochloric acid and perchloric acid; and organic acids such as crotonic acid and benzoic acid, with the tertiary amines being preferred. The imidation catalyst may be added in an amount of 1 to 10 mol % on the basis of the acyl-containing compound.

Alternatively, there is preferably used such a method in which the acyl-containing compound, the imino-forming compound, the organic polar solvent and the optional imidation catalyst are charged into a reaction vessel all together, and then the heating is started to immediately initiate the dehydrating imidation.

The molar ratio of the imino-forming compound to the acryl-containing compound is preferably from 0.95 to 1.05 and more preferably from 0.99 to 1.01. Within the above range, a colorless transparent polyimide resin having an adequate logarithmic viscosity (0.5 to 2.0) and a polyimide film having a sufficient strength are obtained.

The temperature of the dehydrating imidation is preferably from 160 to 200° C., more preferably from 170 to 190° C. and still more preferably from 180 to 190° C. Within the above range, the resultant resin has a sufficiently high molecular weight, and the considerable increase in the solution viscosity and the resultant scorch and stick of the resin to the wall of reactor can be prevented. If desired, an azeotropic dehydration agent such as toluene and xylene may be used. Although depending upon the reactivity of the imino-forming compound, the dehydrating imidation time is preferably from 3 to 12 h and more preferably from 6 to 8 h.

The polyimide resin solution is usually produced by the above methods. The polyimide resin solution may be also produced by the following third method, in which a solution of polyamic acid is prepared; a dehydration agent such as acetic anhydride and a known tertiary amine are added to the solution; the imidation is conducted at 100 to 120° C. for 3 to 6 h; the resultant polyimide resin is precipitated by adding a poor solvent for polyimide such as methanol; the solid polyimide resin is obtained through filtration, washing and drying; and a solution of polyimide resin is obtained by dissolving the polyimide resin in an organic polar solvent.

Examples of the organic polar solvent for dissolving the polyimide resin include γ-butyrolactone, N,N-dimethylacetamide, N,N-dimethylformamide, N-methyl-2-pyrrolidone, dimethyl sulfoxide, hexamethylphosphoramide, p-chlorophenol, m-cresol, tetramethylene sulfone and propylene carbonate. These organic polar solvents may be used alone or in combination of two or more. Cyclic ethers such as tetrahydrofuran, 1,4-dioxane and 1,3-dioxolane, and cyclic ketones such as cyclohexanone and cyclopentanone may be additionally used unless the solubility of the resin is not lowered.

The polyimide resin produced by the above methods has a repeating unit represented by the following formula 4:

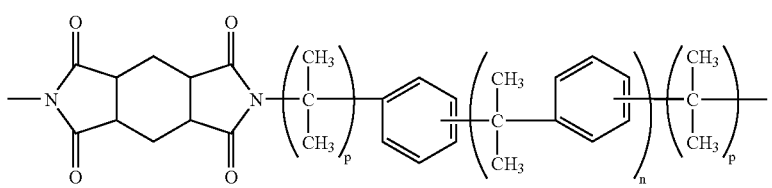

(4)

wherein n and p are the same as defined above, in an amount of preferably 51 mol % or more (inclusive of 100 mol %). Other repeating units are derived from the diamines optionally used. The concentration of the polyimide resin in the solution of polyimide resin produced by the above methods is preferably from 10 to 50% by weight and more preferably from 20 to 30% by weight.

Production of Polyimide Film

The polyimide resin solution produced by the above methods is cast on a glass substrate or a stainless steel substrate having a good releasability, to form a coating film. The coating film is then pre-dried at 80 to 120° C. for about 30 to 60 min until the film becomes self-supporting on a hot plate or in a drying oven. The coating film peeled off from the substrate is fixed at both ends and heated to at least a boiling point of the solvent used and preferably at a temperature 5 to 10° C. higher than the boiling point over 1 h while preventing the shrinking of the film and the bumping of the residual solvent. Then, the film is vacuum-dried at the same temperature, to obtain a polyimide resin film.

Although depending upon the thickness of the film, the vacuum drying time is, for example, preferably 5 to 48 h and more preferably 8 to 24 h for reducing the content of the residual solvent to less than 1% for a film having a thickness of 150 to 200 μm which is used as a plastic substrate for flexible displays.

The polyimide resin solution may be cast on a glass substrate or a stainless steel substrate by any known film-forming method such as a dry method or a dry/wet method. Examples of the film-forming method include a casting method using a die extrusion, and coating methods using an applicator, a coater, etc. Also, the polyimide resin solution may be cast on an organic polymer film such as a polyethylene terephthalate film and a polyethylene naphthalate film.

For the purpose of enhancing the properties of the polyimide resin film such as surface smoothness and releasability, surfactants and internal release agents may be added to the film at any stage of the production process.

A photoelectric transfer device having excellent properties can be produced by applying the polyimide resin solution produced by the above methods onto a photoelectric transfer device and then evaporating off the organic solvent to form a resin seal having an excellent heat resistance and a high refractive index. Known sealing resins for LED contain in some cases a fluorescent material, etc. for transferring the wavelength of emitted light to the visible range. The polyimide resin of the present invention is suitably used a sealing material for LED because it is excellent in mixing property, dispersibility and stability when mixed with various fluorescent materials. In addition, to control the direction of light emission, the resin-sealed portion may be provided on its surface with a lens made of an optional transparent resin. Since the light introduced into the resin lens is previously converted into a visible light having a low energy by passing through the resin-sealed portion, the lens shows a sufficient durability even if it is made of a general-purpose epoxy resin, etc. The polyimide resin of the present invention exhibits a good adhesion to a lens made of epoxy resins, etc., and therefore, especially suitable as a sealing material for LED.

EXAMPLES

The present invention is described in more detail by referring to the following examples. However, it should be noted that the following examples are only illustrative and not intended to limit the invention thereto.

Properties of the polyimide resins and the polyimide films obtained in the following examples and comparative examples were measured by the following methods.

(1) Logarithmic Viscosity

A part of a polyimide resin solution was added to absolute methanol to precipitate a polyimide resin, and the precipitated polyimide resin was separated by filtration from unreacted monomers. After vacuum-drying the separated resin at 80° C. for 12 h, 0.1 g of the dried resin was dissolved in 20 mL of N-methyl-2-pyrrolidone. Using the results measured by a Canon Fenske viscometer, the logarithmic viscosity ($\mu$) at 30° C. was calculated from the following formula:

$$\mu = [\ln(t_s)/(t_0)]/C$$

wherein $t_0$ is the dropping time of the solvent; $t_s$ is the dropping time of the diluted polymer solution; and C is 0.5 g/dL.

(2) Glass Transition Temperature (Tg)

Using a differential scanning calorimeter "DSC-40M Model" available from Shimadzu Corporation, the polyimide film was heated to 400° C. at a temperature rise rate of 10° C./min in a nitrogen atmosphere to measure the glass transition temperature.

(3) Water Absorption

The polyimide film having a thickness of about 25 μm was dried at 150° C. for 1 h. The water absorption of the polyimide film was calculated from the following formula:

$$\text{Water Absorption}(\%) = (W2 - W1) \div W1 \times 100$$

wherein W1 is the weight of the polyimide film after kept in a desiccator for 1 h; and W2 is the weight of the polyimide film after immersing in distilled water at 23° C. for 24 h and then wiping off the water attached to its surface.

(4) Total Light Transmittance and YI Value

The total light transmittance and YI value of the polyimide film as indices for evaluation of a colorlessness and a transparency according to "JIS K7105: Transparency Test" were measured using a color difference and turbidity meter "COI-300A" available from Nippon Denshoku Industries Co., Ltd.

(5) Refractive Index

Using an refractometer "DR-M2" available from Atago Co., Ltd., which was fitted with a 589 nm interference filter, the refractive index of the polyimide film was measured at 23° C.

(6) Accelerated Heat Resistance Test

The polyimide film test specimen having a size of 50×50 mm was placed in a hot-air drier maintained at 150° C., and the change in light transmittance at 400 nm and YI value were monitored.

Reference Example 1

Synthesis of 1,2,4,5-cyclohexanetetracarboxylic dianhydride

A 5-L autoclave made of Hastelloy (HC22) was charged with 552 g of pyromellitic acid, 200 g of a catalyst formed by supporting Rh on activated carbon (available from N.E. Chemcat Corporation) and 1656 g of water. The interior of the autoclave was replaced with a hydrogen gas while stirring the contents. Then, the hydrogen pressure was adjusted to 5.0 MPa and the temperature was raised to 60° C. While maintaining the hydrogen pressure at 5.0 MPa, the reaction was allowed to proceed for 2 h. After replacing the hydrogen gas in the autoclave with nitrogen gas, the reaction product solution was discharged from the autoclave. The reaction product solution was filtered while it was hot to separate the catalyst. The filtrate was concentrated by distillation under reduced pressure using a rotary evaporator to evaporate off water, thereby precipitating crystals. The precipitated crystals were collected by a solid-liquid separation at room temperature, and then, dried to obtain 481 g of 1,2,4,5-cyclohexanetetracarboxylic acid (yield: 85.0%).

Next, 481 g of 1,2,4,5-cyclohexanetetracarboxylic acid thus obtained and 4000 g of acetic anhydride were charged into a 5-L separable glass flask, and the interior of the flask was purged with nitrogen gas while stirring the contents. The temperature was raised to the refluxing temperature of the solvent in a nitrogen gas atmosphere, and the solvent was refluxed for 10 min. The temperature was lowered to room temperature while stirring, thereby precipitating crystals. The precipitated crystals were collected by a solid-liquid separation, and then dried to obtain the primary crystals. Separately, the separated mother liquor was concentrated under reduced pressure using a rotary evaporator to precipitate crystals. The precipitated crystals were collected by a solid-liquid separation, and then, dried to obtain the secondary crystals. Thus, 375 g of 1,2,4,5-cyclohexanetetracarboxylic dianhydride was obtained in total of the primary and secondary crystals (yield of anhydride: 96.6%).

Example 1

In a 500-mL five-necked flask equipped with a thermometer, a stirrer, a nitrogen inlet tube and a cooling tube with a fractionating device, 34.58 g (0.1 mol) of 1,3-bis(4-amino-α, α-dimethylbenzyl)benzene (4,4'-(m-phenylenediisopropylidene)dianiline also known as BisA-M) was dissolved in a solvent (68.65 g of γ-butyrolactone and 17.16 g of N,N-dimethylacetamide) in a nitrogen atmosphere. The obtained solution was cooled to 5° C. in an ice-water bath. While maintaining the temperature at 5° C., 22.62 g (0.1 mol) of 1,2,4,5-cyclohexanetetracarboxylic dianhydride and 0.50 g (0.005 mol) of triethylamine as an imidation catalyst were added at one time. After the addition, the temperature was raised to 180° C. to continue the reflux for 8 h while removing the distillate from time to time. After the completion of the reaction, the inside temperature was lowered to 100° C. by air cooling. Thereafter, the reaction solution was diluted by adding 143.6 g of N,N-dimethylacetamide and cooled while stirring, thereby obtaining a polyimide resin solution having a solid content of 20% by weight. The weight of the polyimide resin solution was 262.47 g and the total amount of the distillate was 4.86 g. A part of the polyimide resin solution was poured into 1 L of methanol to precipitate the polyimide. The polyimide separated by filtration was washed with methanol and then dried at 100° C. for 24 h in a vacuum dryer, thereby obtaining a white powder. In the IR spectrum thereof, the absorptions at 1702 cm$^{-1}$ and 1772 cm$^{-1}$ which were characteristic of imido group were found. The logarithmic viscosity of the polyimide was 0.94.

The obtained polyimide resin solution was cast on a stainless steel substrate which had been uniformly coated with a release agent for plastics "Pericote" available from Chukyo Kasei Kogyo Co., Ltd. using a 1000-μm doctor blade. The substrate thus coated was held on a hot plate at 100° C. for 60 min to evaporate the solvent, thereby obtaining a primarily dried film which was colorless, transparent and self-supporting. The obtained film was fixed in a stainless steel frame and vacuum-dried at 200° C. for 8 h to remove the residual solvent, thereby obtaining a colorless transparent polyimide film having a thickness of 117 μm. The total light transmittance, YI value, water absorption and glass transition temperature of the obtained polyimide film are shown in Table 1.

Example 2

The same procedure as in Example 1 was repeated except for using 27.66 g (0.08 mol) of 1,4-bis(4-amino-α,α-dimethylbenzyl)benzene (BisA-P) and 2.16 g (0.02 mol) of m-phenylenediamine (MPD) in place of 34.58 g (0.1 mol) of 1,3-bis(4-amino-α,α-dimethylbenzyl)benzene and changing the refluxing time to 6 h, thereby obtaining 242.33 g of a polyimide resin solution. Further, in the same manner as in Example 1, a white powder was obtained. The absorptions at 1704 cm$^{-1}$ and 1770 cm$^{-1}$ which were characteristic of imido group were found on the IR spectrum thereof. The logarithmic viscosity of the polyimide was 1.01.

The obtained polyimide resin solution was formed into a polyimide film having a thickness of 112 μm in the same manner as in Example 1. The total light transmittance, YI value, water absorption and glass transition temperature of the resultant polyimide film are shown in Table 1.

Example 3

The same procedure as in Example 1 was repeated except for using 27.66 g (0.08 mol) of 1,4-bis(4-amino-α,α-dimethylbenzyl)benzene (BisA-P) and 7.38 g (0.02 mol) of 4,4'-bis(4-aminophenoxy)biphenyl (BAPB) in place of 34.58 g (0.1 mol) of 1,3-bis(4-amino-α,α-dimethylbenzyl)benzene and changing the refluxing time to 6 h, thereby obtaining 264.16 g of a polyimide resin solution. Further, in the same manner as in Example 1, a white powder was obtained. The absorptions at 1704 cm$^{-1}$ and 1770 cm$^{-1}$ which were characteristic of imido group were found on the IR spectrum thereof. The logarithmic viscosity of the polyimide was 0.87.

The obtained polyimide resin solution was formed into a colorless transparent polyimide film having a thickness of 112 μm in the same manner as in Example 1. The total light transmittance, YI value, water absorption and glass transition temperature of the resultant polyimide film are shown in Table 1.

Example 4

The same procedure as in Example 1 was repeated except for using 24.52 g (0.1 mol) of m-α,α,α',α'-tetramethylxylylenediisocyanate (m-TMDI) in place of 34.58 g (0.1 mol) of 1,3-bis(4-amino-α,α-dimethylbenzyl)benzene, thereby obtaining 214.16 g of a polyimide resin solution. Further, in the same manner as in Example 1, a white powder was obtained. The absorptions at 1698 cm$^{-1}$ and 1776 cm$^{-1}$ which were characteristic of imido group were found on the IR spectrum thereof. The logarithmic viscosity of the polyimide was 0.72.

The obtained polyimide resin solution was formed into a colorless transparent polyimide film having a thickness of 112 μm in the same manner as in Example 1. The total light transmittance, YI value, water absorption and glass transition temperature of the resultant polyimide film are shown in Table 1.

Comparative Example 1

The same procedure as in Example 1 was repeated except for using 19.83 g (0.1 mol) of bis(4-aminophenyl)methane (DDM) in place of 34.58 g (0.1 mol) of 1,3-bis(4-amino-α, α-dimethylbenzyl)benzene and changing the refluxing time to 6 h, thereby obtaining 210.50 g of a polyimide resin solution. Further, in the same manner as in Example 1, a white powder was obtained. The absorptions at 1700 cm$^{-1}$ and 1768 cm$^{-1}$ which were characteristic of imido group were found on the IR spectrum thereof. The logarithmic viscosity of the polyimide was 1.04.

The obtained polyimide resin solution was formed into a colorless transparent polyimide film having a thickness of 108 μm in the same manner as in Example 1. The total light transmittance, YI value, water absorption and glass transition temperature of the resultant polyimide film are shown in Table 1.

Comparative Example 2

The same procedure as in Example 1 was repeated except for using 10.11 g (0.05 mol) of bis(4-aminophenyl)methane and 5.42 g (0.05 mol) of m-phenylenediamine (MPD) in place of 34.58 g (0.1 mol) of 1,3-bis(4-amino-α,α-dimethylbenzyl) benzene and changing the refluxing time to 6 h, thereby obtaining 210.50 g of a polyimide resin solution. Further, in the same manner as in Example 1, a white powder was obtained. The absorptions at 1701 $cm^{-1}$ and 1769 $cm^{-1}$ which were characteristic of imido group were found on the IR spectrum thereof. The logarithmic viscosity of the polyimide was 0.67.

The obtained polyimide resin solution was formed into a colorless transparent polyimide film having a thickness of 106 μm in the same manner as in Example 1. The total light transmittance, YI value, water absorption and glass transition temperature of the resultant polyimide film are shown in Table 1.

Comparative Example 3

The same procedure as in Example 1 was repeated except for using 20.10 g (0.1 mol) of bis(4-aminophenyl) ether (oxydianiline: ODA) in place of 34.58 g (0.1 mol) of 1,3-bis(4-amino-α,α-dimethylbenzyl)benzene and changing the refluxing time to 3 h, thereby obtaining 205.05 g of a polyimide resin solution. Further, in the same manner as in Example 1, a white powder was obtained. The absorptions at 1691 $cm^{-1}$ and 1764 $cm^{-1}$ which were characteristic of imido group were found on the IR spectrum thereof. The logarithmic viscosity of the polyimide was 1.21.

The obtained polyimide resin solution was formed into a colorless transparent polyimide film having a thickness of 115 μm in the same manner as in Example 1. The total light transmittance, YI value, water absorption and glass transition temperature of the resultant polyimide film are shown in Table 1.

Comparative Example 4

The same procedure as in Example 1 was repeated except for using 43.25 g (0.1 mol) of bis[4-(4-aminophenoxy)phenyl] sulfone (BAPS) in place of 34.58 g (0.1 mol) of 1,3-bis (4-amino-α,α-dimethylbenzyl)benzene and changing the refluxing time to 6 h, thereby obtaining 311.92 g of a polyimide resin solution. Further, in the same manner as in Example 1, a white powder was obtained. The absorptions at 1704 $cm^{-1}$ and 1772 $cm^{-1}$ which were characteristic of imido group were found on the IR spectrum thereof. The logarithmic viscosity of the polyimide was 0.90.

The obtained polyimide resin solution was formed into a colorless transparent polyimide film having a thickness of 116 μm in the same manner as in Example 1. The total light transmittance, YI value, water absorption and glass transition temperature of the resultant polyimide film are shown in Table 1.

TABLE 1

| | Imino-forming compound | Other diamines | Total light transmittance (%) | YI value (%) | Film thickness (μm) | Tg (° C.) | Water absorption (%) |
|---|---|---|---|---|---|---|---|
| Examples | | | | | | | |
| 1 | BisA-M | — | 90.5 | 2.2 | 117 | 264 | 1.5 |
| 2 | BisA-P | MPD | 89.5 | 2.4 | 122 | 318 | 2.4 |
| 3 | BisA-P | BAPB | 90.1 | 2.3 | 110 | 310 | 2.0 |
| 4 | m-TMDI | — | 89.3 | 3.3 | 112 | 347 | 1.8 |
| Comparative Examples | | | | | | | |
| 1 | — | DDM | 86.9 | 13.3 | 108 | 301 | 3.9 |
| 2 | — | DDM MPD | 88.8 | 4.2 | 106 | 330 | 4.8 |
| 3 | — | ODA | 89.8 | 3.0 | 115 | 315 | 5.4 |
| 4 | — | BAPS | 88.9 | 3.2 | 116 | 293 | 6.2 |

Example 5

The polyimide resin powder produced in the same manner as in Example 2 was dissolved in 1,3-dioxolane (boiling point: 78° C.) to prepare a polyimide resin solution having a solid content of 20% by weight. The prepared solution was cast on a glass substrate which had been uniformly coated with a release agent for plastics using a 2000-μm doctor blade. Next, the resultant substrate thus coated was held on a hot plate at 60° C. for 1 h and further at 90° C. for 1 h to evaporate the solvent and then dried in a hot-air dryer at 150° C. for 3 h. After cooling, the coating film was peeled off from the substrate, thereby obtaining a dried colorless transparent polyimide film. The thickness and refractive index of the film and the result of the accelerated heat resistance test are shown in Table 2.

Comparative Example 5

Into a 100-mL beaker, 38 g of a bisphenol A-type liquid epoxy resin ("Epikote 828US" available from Japan Epoxy Resin Co., Ltd.; epoxy equivalent: 190), 32.8 g of methylhexahydrophthalic anhydride ("Rikacid MH-700G" available from New Japan Chemical Co., Ltd.; 1.0 equivalent) and 0.35 g of 2-ethyl-4-methylimidazole as a curing accelerator were placed and mixed thoroughly using a stirring bar to prepare a mixed epoxy resin solution. Into a silicone resin mold of 60 mm (length)×60 mm (width)×10 mm (height), 3 g of the mixed epoxy resin solution was poured. The resin mold put on a glass substrate was placed horizontally in a hot-air dryer, to allow the curing reaction at 90° C. for 1 h, at 120° C. for 3 h and further at 150° C. for 3 h. After cooling, a cured sheet product which was colorless and transparent was released from the resin mold. The thickness and refractive index of the cured sheet product and the result of the accelerated heat resistance test are shown in Table 2

TABLE 2

|  | Example 5 | Comparative Example 5 |
|---|---|---|
| Refractive index | 1.594 | 1.536 |
| Film thickness (μm) | 199 | 554 |

| Accelerated heat resistance test | | | | |
|---|---|---|---|---|
| | Light transmittance (%) | YI value | Light transmittance (%) | YI value |
| 0 h | 81.1 | 3.26 | 91.3 | 0.96 |
| 64 h | 80.7 | 4.03 | 87.0 | 5.73 |
| 207 h | 78.4 | 4.77 | 57.2 | 35.9 |

INDUSTRIAL APPLICABILITY

As is apparent from the comparison between Examples 1 to 4 and Comparative Examples 1 to 4, the polyimide resins of the present invention are suitably used in optical applications such as materials of a substrate for flat panel displays and mobile phones, optical fibers, light wave guides and optical adhesives because of their high heat resistance, high transparency and low water absorption. As is apparent from the comparison between Example 5 and Comparative Example 5, the polyimide films of the present invention show little decrease in the light transmittance and little increase in the YI value upon the exposure to high temperatures and have a high refractive index, and therefore, are suitable as a sealing material for photoelectric transfer devices such as light-emitting diodes (LED) and optical sensors.

What is claimed is:

1. A process for producing a polyimide resin, comprising a step of reacting at least one acyl-containing compound with at least one imino-forming compound, wherein the at least one acyl-containing compound consists essentially of one or more acyl-containing compounds selected from the group consisting of 1,2,4,5-cyclohexanetetracarboxylic acid represented by the following formula 1:

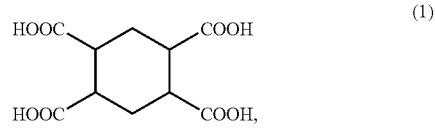

1,2,4,5-cyclohexanetetracarboxylic dianhydride represented by the following formula 2:

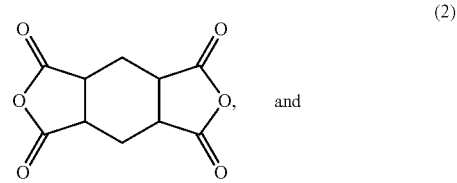

reactive derivatives thereof, and the imino-forming compound is selected from the group consisting of compounds containing at least one phenylene group and at least one isopropylidene group, which is represented by the following formula 3:

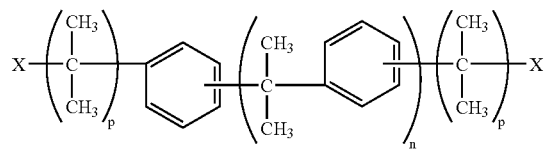

wherein X is —NH$_2$, n is 2, and p is 0, wherein the reaction is conducted in an organic polar solvent in the presence of an imidation catalyst under heating, to produce a polyimide resin solution of said polyimide resin in said organic polar solvent from said acyl-containing compound and said imino-forming compound in a single step, the imidation catalyst being a tertiary amine, and wherein the heating is conducted at 160 to 200° C.

2. A polyimide resin consisting essentially of a repeating unit represented by the following formula 4:

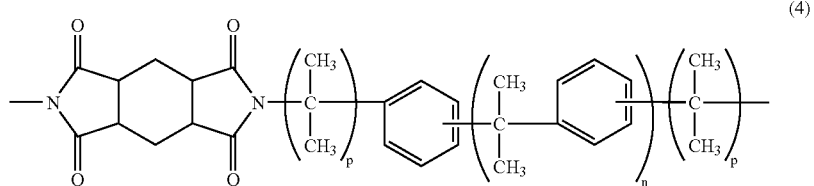

wherein n is 2 and p is 0.

3. A process for producing a polyimide film comprising:
casting the polyimide resin solution including the polyimide resin produced by the process as defined in claim 1 in said organic polar solvent over a substrate to obtain a cast film; and
removing the solvent from the cast film by evaporation.

4. The process according to claim 3, wherein the solvent is removed from the cast film by evaporation at 80 to 120° C. to form a self-supporting film, and then the self-supporting film is vacuum-dried at a temperature within a range of from a boiling point of the solvent to a temperature 10° C. higher than the boiling point to further remove the solvent.

5. A sealing material for photoelectric transfer devices, comprising the polyimide resin as defined in claim 2.

6. The process according to claim 1, wherein the heating is conducted for 3 to 12 h.

7. A process for producing a polyimide film comprising:
casting a solution of the polyimide resin as defined in claim 2 in an organic polar solvent over a substrate to obtain a cast film; and
removing the solvent from the cast film by evaporation.

8. The process according to claim 7, wherein the solvent is removed from the cast film by evaporation at 80 to 120° C. to form a self-supporting film, and then the self-supporting film is vacuum-dried at a temperature within a range of from a boiling point of the solvent to a temperature 10° C. higher than the boiling point to further remove the solvent.

9. The process according to claim 1, wherein said organic polar solvent is an aprotic organic polar solvent.

10. The process according to claim 1, wherein said organic polar solvent is at least one selected from the group consisting of γ-butyrolactone and N,N-dimethylacetamide.

11. The process according to claim 1, wherein the heating is conducted at a temperature of 180 to 190° C.

12. The process according to claim 3, wherein the polyimide resin solution has a concentration of the polyimide resin of 10 to 50% by weight.

13. The process according to claim 1, wherein said at least one acyl-containing compound consists of said one or more acyl-containing compounds.

14. The polyimide resin according to claim 2, consisting of said repeating unit represented by said formula 4.

* * * * *